United States Patent
Resnick

(10) Patent No.: US 8,038,187 B2
(45) Date of Patent: Oct. 18, 2011

(54) FOOD UTENSIL

(75) Inventor: Gregory A. Resnick, New Britain, CT (US)

(73) Assignee: Future Sticks Inc., Fort Worth, TX (US)

( * ) Notice: Subject to any disclaimer, the term of this patent is extended or adjusted under 35 U.S.C. 154(b) by 1 day.

(21) Appl. No.: 12/171,368

(22) Filed: Jul. 11, 2008

(65) Prior Publication Data

US 2009/0250956 A1    Oct. 8, 2009

Related U.S. Application Data

(60) Provisional application No. 61/043,191, filed on Apr. 8, 2008.

(51) Int. Cl.
*A47J 43/00* (2006.01)
(52) U.S. Cl. .......................... 294/1.1; 294/5.5
(58) Field of Classification Search ........... 294/99.2, 294/1.1, 5.5, 16; D7/642, 687
See application file for complete search history.

(56) References Cited

U.S. PATENT DOCUMENTS

| | | | | |
|---|---|---|---|---|
| 3,748,778 A | * | 7/1973 | Ellies et al. | 446/106 |
| D283,192 S | * | 4/1986 | Kono | D7/642 |
| 5,911,462 A | * | 6/1999 | Hui | 294/99.2 |
| D433,883 S | * | 11/2000 | Wei | D7/642 |
| D446,425 S | * | 8/2001 | Wei | D7/642 |
| 2009/0091146 A1 | * | 4/2009 | Liu | 294/1.1 |

FOREIGN PATENT DOCUMENTS

JP    2005/199019    *    7/2005

* cited by examiner

*Primary Examiner* — Paul T Chin
(74) *Attorney, Agent, or Firm* — Michaud-Kinney Group LLP

(57) ABSTRACT

A food utensil has an elongate member that has a first end, a second end and a longitudinal surface extending from the first end to the second end. The first end includes a plurality of protrusions disposed circumferentially around the longitudinal surface at the first end. A pair of tongs includes at least one such elongate member, hingedly interconnected to another such elongated member. In one embodiment, the utensil is a chopstick, and preferably is provided as a pair of two such chopsticks. A method of making a food utensil includes forming an elongate member having a first end and a second end, and forming a plurality of protrusions circumferentially around a first end of the elongate member.

12 Claims, 5 Drawing Sheets

FOOD UTENSIL

CROSS-REFERENCE TO RELATED APPLICATIONS

This patent application claims benefit under 35 U.S.C. §119(e) of copending, U.S. Provisional Patent Application, Ser. No. 61/043,191, filed Apr. 8, 2008, the disclosure of which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office files or records, but otherwise reserves all copyright rights whatsoever.

BACKGROUND OF THE INVENTION

1. Field of the Invention

This invention relates to food utensils and, in particular, to utensils having portions configured for pushing, grasping and otherwise manipulating food.

2. Description of the Related Art

Specialized food utensils have long been used for cooking, handling and eating food. Tongs are food utensils that comprise two arms joined by a hinge. Chopsticks are food utensils that are traditionally independent arms used in pairs when cooking, handling and eating food. Conventional tong arms and chopsticks have proximal and distal ends, and are held by a user at a handling portion of the arm or chopstick near the proximal end thereof. A food-grabbing portion of the tong arm or chopstick is near the distal end thereof. Typically, chopsticks are smooth sticks used in pairs, held in one hand at the handling portions such that the food-grabbing portions may be used to push, grasp and/or carry food from a bowl or plate to the user's mouth. During cooking, the tongs or chopsticks may be used to stir, turn or otherwise manipulate food.

Many new users find traditional chopsticks difficult to use. Some of the difficulty arises from the fact that the sticks are not connected to each other and can be difficult to manipulate in one hand. To address this difficulty, it is known in the art to provide a mechanical hinge at or near the proximal ends of the chopsticks, so that the chopsticks resemble a miniature set of tongs. However, providing a hinge adds significantly to the cost of manufacturing chopsticks, and the use of hinged chopsticks may be looked down upon by users of traditional chopsticks.

Another difficulty in the use of chopsticks and tongs is that once food is caught between the sticks or arms, the food may easily slide or slip from the grasp due to the generally smooth surface of the sticks or arms. One approach to address this problem in a hinged chopstick utensil shown in U.S. Pat. No. 6,454,328 is to provide cross-wise serrations in the food-grabbing portions of the two chopsticks in the utensil. The serrations are formed on flattened, mutually-facing (i.e., "inside") surfaces of the chopsticks, and the serrated surfaces remain facing each other by virtue of the hinge formed by enlarged portions 25 and 28 and the axle 24. The inventor has discovered that serrations and other food-grabbing surface textures on conventional chopsticks meant to facilitate gripping food, such as grooves or dimples, have short-lived effectiveness because the serrations, grooves and dimples are typically sized such that they become impacted with food and then fail to provide a textured gripping surface. Accordingly, the inventor has discovered that a need exists for an improved food utensil that overcomes the shortcomings of conventional food utensils.

SUMMARY OF THE INVENTION

The present invention resides in one aspect in a food utensil having an elongate member that has a first end, a second end and a longitudinal surface extending from the first end to the second end, wherein the first end includes a plurality of protrusions disposed circumferentially around the longitudinal surface at the first end.

The present invention resides in one aspect in a pair of tongs having two hingedly interconnected elongate members including at least one member having protrusions around a food-engaging end as described herein, opposite from where the members are hingedly interconnected.

In a particular embodiment, the present invention provides a chopstick in the form of an elongate member having a first end, a second end and a longitudinal surface extending from the first end to the second end, wherein the first end of each chopstick includes a plurality of protrusions disposed circumferentially around the first end. In a particular embodiment, the chopstick is smooth and tapered at a second end opposite from the first end. Optionally, two such chopsticks may be provided. The two chopsticks may optionally be hingedly interconnected.

The present invention resides in another aspect in a method of making a food utensil, comprising forming an elongate member having a first end and a second end, and forming a plurality of protrusions circumferentially around the first end of the elongate member.

DETAILED DESCRIPTION OF PREFERRED EMBODIMENTS

The present invention provides a novel configuration of an elongate member for use individually or in pairs as food utensils. It should be appreciated that, in accordance with the present invention, a food utensil broadly includes a device for pushing, grasping, carrying, stirring, turning and otherwise manipulating food whether from a bowl, plate or the like, when eating, or in a pot, pan, wok, or the like, when cooking. The elongate member has two ends, a longitudinal axis that extends from one end to the other, and a longitudinal surface extending from the first end to the second end. In one embodiment, the longitudinal surface has a textured configuration at one end, to facilitate manipulating, grabbing and holding food, and a smooth end opposite the textured end. In one embodiment, the smooth end is tapered.

Figure 1:
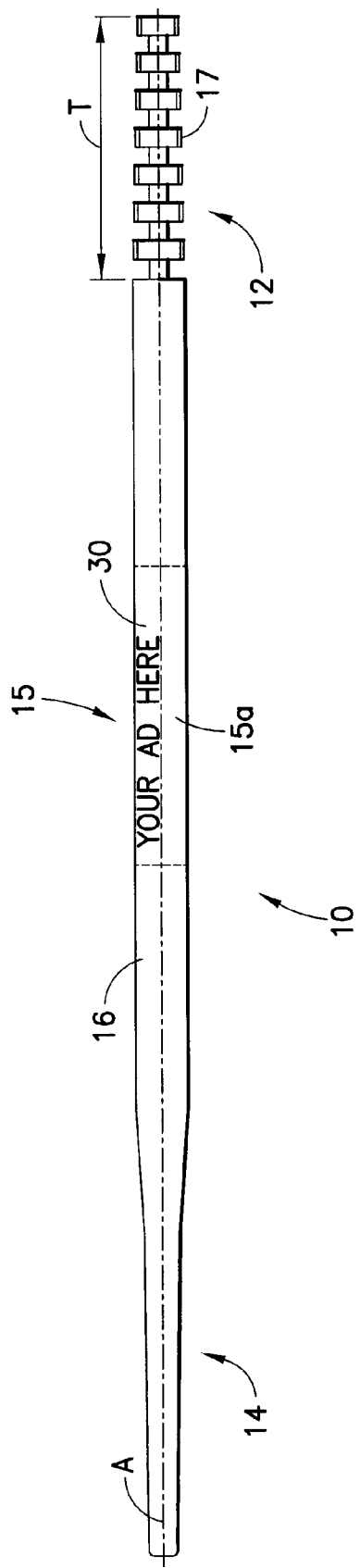
FIG. 1 is an elevational view of a food utensil according to an illustrative embodiment of the present invention.

FIG. 1 illustrates one embodiment of a food utensil 10 including an elongate member having a textured end configured as, for example, a chopstick. The chopstick 10 has a longitudinal axis A, a first end 12, a second end 14, an intermediate portion 15 between the first end 12 and the second end 14, and a longitudinal surface 16 extending from the first end 12 to the second end 14. A portion 17 of the longitudinal surface 16 of the chopstick 10 at the first end 12 is textured over an axial length T as described further herein. In one embodiment, the second end 14 has a smooth surface and is tapered in its width from a larger width proximate the intermediate portion 15 to a smaller width terminating at the second end 14. As such, the second end 14 resembles a food-handling end of a traditional chopstick.

In one embodiment, the intermediate portion 15 includes at least one surface portion 15a having indicia 30 affixed to, or made a part of the surface portion 15a by means of, for example, a label, direct printing, etching, carving, molding, or the like. The indicia 30 may include, for example, advertising information, source or event designation identification, and the like, such that the food utensil 10 may serve as a gift or memento of an event of interest or special occasion celebrated at the designation.

Figure 2:
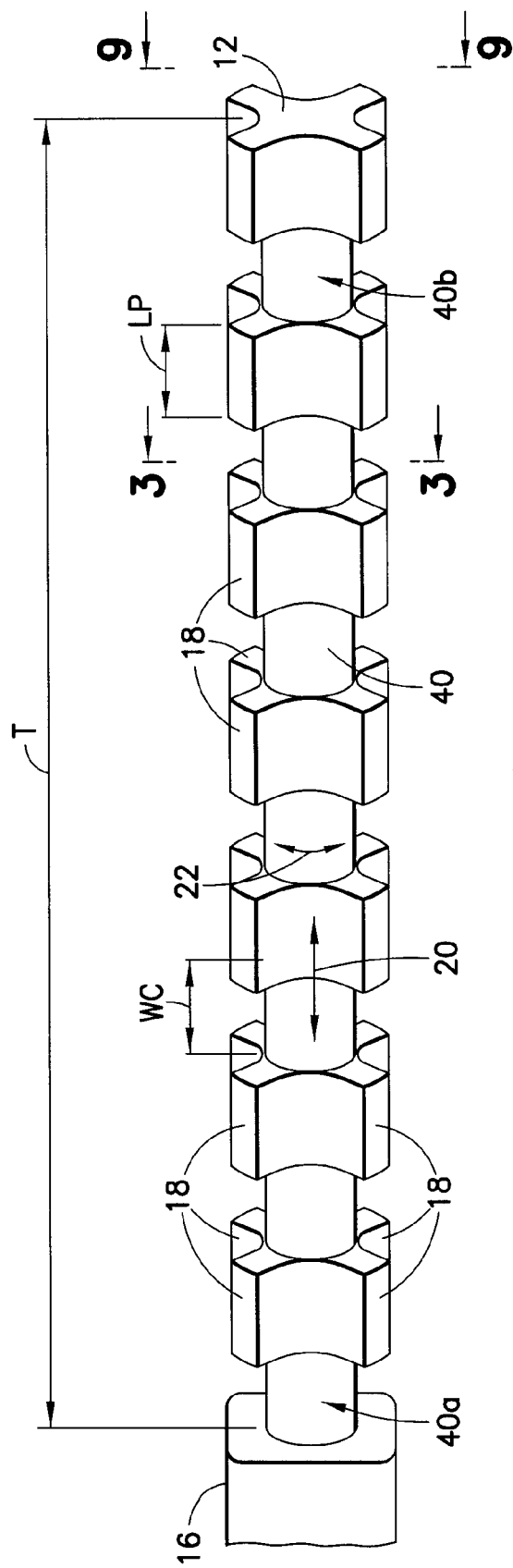
FIG. 2 is a partial perspective view of one end of the food utensil of FIG. 1.

As is best illustrated in FIG. 2, the textured surface portion 17 at the first end 12 comprises a plurality of protrusions 18 disposed circumferentially around the first end 12 of the elongate member 10. In one embodiment, a plurality of intersecting grooves 20, 22 define the protrusions 18. For example, the protrusions extend from the grooves 20, 22 in the direction of the longitudinal surface 16. One method for forming such protrusions 18 is to start with a chopstick having a generally smooth longitudinal surface 16 that extends a length of the chopstick, and then forming (by cutting, machining or any other method known in the art) a plurality of longitudinal grooves 20 and a plurality of circumferential grooves 22 that intersect the longitudinal grooves 20. The intersecting grooves 20, 22 define the protrusions 18. As can be appreciated, it is within the scope of the present invention to employ other methods of forming the protrusions 18. For example, the chopstick 10 including the protrusions 18 may be molded from a suitable material such as, for example, plastic, polypropylene, polyphenylene, polystyrene or like thermoplastic material.

Figure 9:
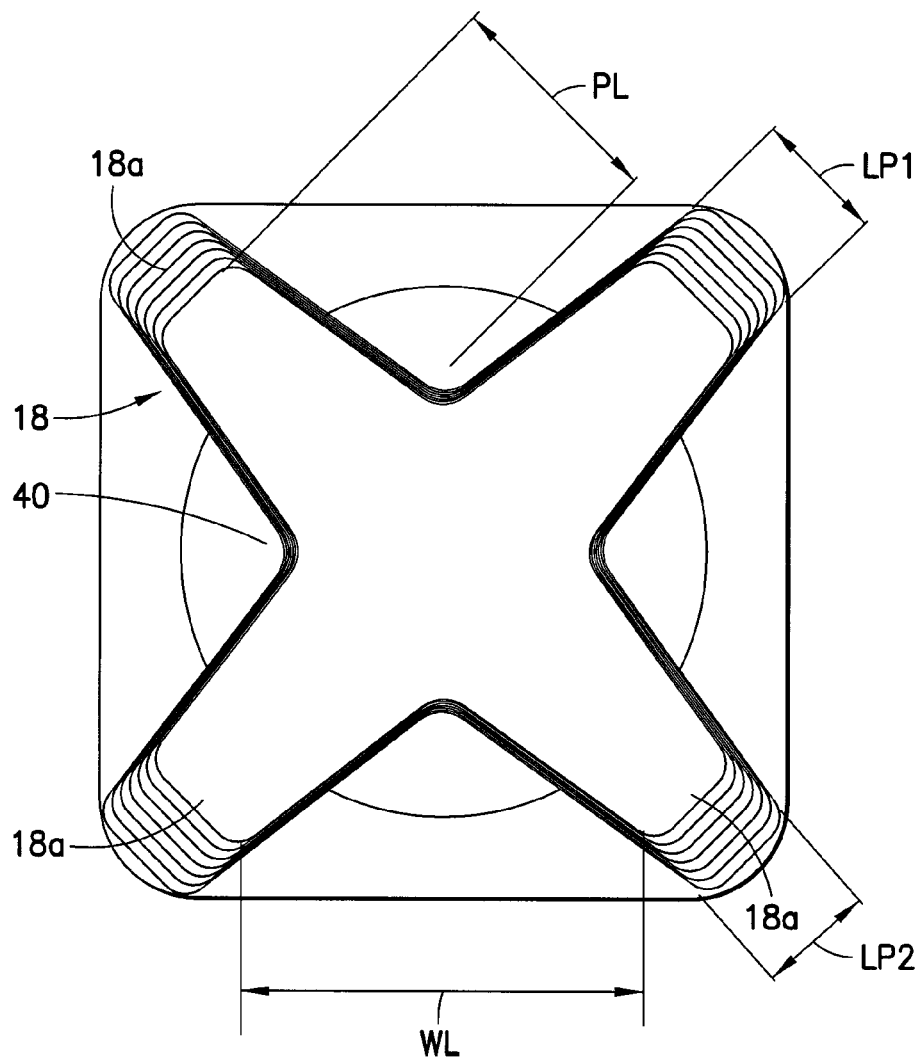
FIG. 9 is an end view of the food utensil of FIG. 2 taken along line 9-9.

If the exterior surfaces of the protrusions 18 are not further processed (e.g., machined or sanded down), the longitudinally aligned exterior surfaces of the protrusions are co-planar with each other and with the remaining longitudinal surface 16 of the chopstick. In one embodiment, illustrated in FIGS. 2 and 9, the protrusions 18 extend a same length PL from a core 40 portion of the chopstick 10 in a direction of the longitudinal surface 16. In one embodiment the length PL is about 0.078 inch. The core portion 40, however, is tapered from a larger width or diameter proximate the intermediate portion 15 of the chopstick 10 at, for example, a longitudinal position 40a, to a smaller width or diameter of the first end 12 at, for example, a longitudinal position 40b. In one embodiment, the larger width is about 0.188 inch and the smaller width is about 0.125 inch. Accordingly, the protrusions 18 appear tapered from the larger width down to the smaller width.

Figure 4:
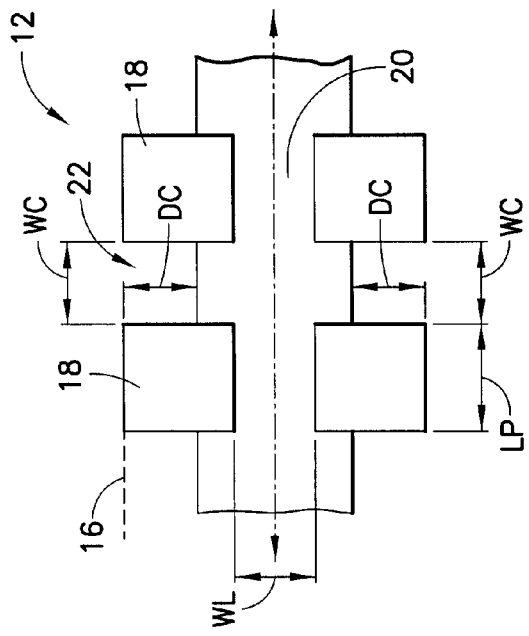
FIG. 4 is a partial elevational view of a portion of the food utensil of FIG. 2.
Figure 6:
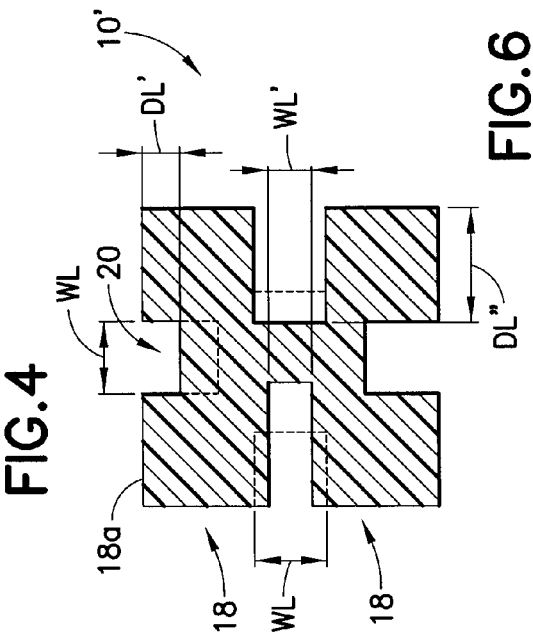
FIG. 6 is a schematic cross-sectional view similar to FIG. 3, of another embodiment of a food utensil as described herein.
Figure 3:
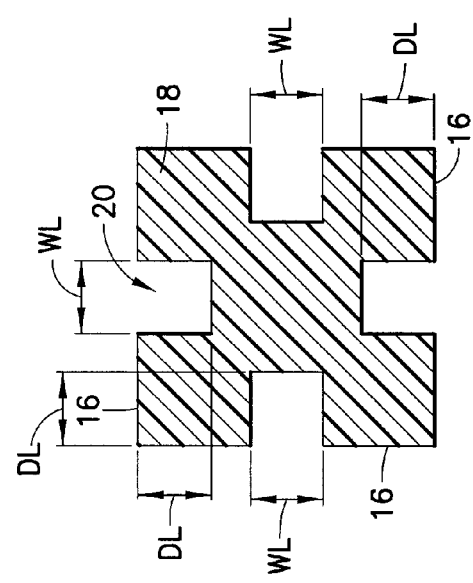
FIG. 3 is cross-sectional view of the food utensil of FIG. 2 taken at line 3-3.
Figure 5:
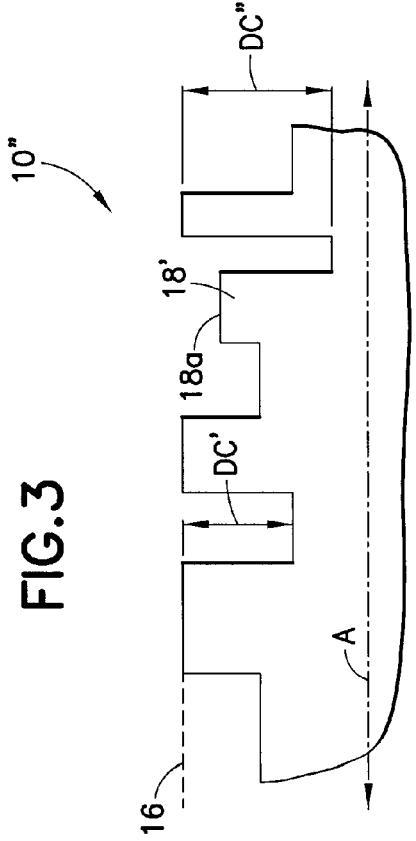
FIG. 5 is schematic partial elevational view of an alternative embodiment of a food utensil as described herein.

Optionally, as shown, the core 40 may be asymmetric by, for example, varying a depth of the grooves 20, 22. For example, the longitudinal grooves 20 each have a same depth DL (FIG. 3) from the longitudinal surface 16, and the circumferential grooves 22 each have a same depth DC (FIG. 4) from the longitudinal surface 16. Furthermore, in the illustrated embodiment, the depths DL of the longitudinal grooves 20 are the same as the depths DC of the circumferential grooves 22. However, the present invention is not limited to grooves of uniform depth, and in other embodiments within the scope of this invention, the depths DC of the circumferential grooves 22 may be different from each other (e.g., DC' vs. DC'', FIG. 5) and/or different from the depths DL of the longitudinal grooves 20, which may also differ from each other (e.g., DL' vs. DL'', FIG. 6). As illustrated in FIG. 6, the widths of the grooves may vary as well (see, e.g., WL vs. WL', FIG. 6). It should be appreciated that the invention is not limited to protrusions whose exterior surfaces are co-planar with the longitudinal surface 16 of the chopstick 10, as the exterior surfaces of one or more of the protrusions 18 may be ground down (see surface 18a, FIG. 6), or augmented, to vary from the longitudinal surface 16. For example, in one embodiment, each edge or corner of a protrusion is chamfered or includes a radius. Similarly, edges or corners of the intermediate portion 15 and second end 16 may be chamfered or include a radius.

Furthermore, it is within the scope of the present invention to form the protrusions in a variety of other ways, for example, by forming two oppositely winding spiral grooves in the surface of the chopstick, or by molding the chopstick from a moldable material, using a mold that is configured to provide protrusions on an outer surface of the molded chopstick. Alternatively, the chopstick may be provided with protrusions by attaching protrusion members around the end of a chopstick having a smooth end.

In accordance with a preferred embodiment, the protrusions are spaced so that when the chopstick 10 is used to manipulate food, the food does not accumulate in the grooves between the protrusions. In a particular embodiment, the longitudinal spacing of the protrusions 18 (e.g., a width WC (FIG. 4) of the circumferential grooves 22) and the circumferential spacing between adjacent protrusions 18 (e.g., a width WL (FIG. 9) of the longitudinal grooves 20) may each be about 0.062 inch. Optionally, an axial length LP (FIG. 2) of protrusions 18 may be about 0.062 inch as well. However, the invention is not limited in this regard, as these various dimensions DL, DC, WC, and WL may be varied without departing from the invention. In one embodiment, upper portions 18a of the protrusions 18 are each of uniform width along the longitudinal surface 16. In another embodiment, one or more of upper portions 18a of the protrusions 18 have a wider width along the longitudinal surface than remaining upper portions. For example, in one embodiment illustrated in FIG. 9, the intersecting grooves define four (4) protrusions at predetermined longitudinal points about the length of the chopstick 10 and a first pair of protrusions is of a first width LP1 and a second pair of protrusions is of a second width LP2, where the first width LP1 is wider than the second width LP2. In one embodiment, LP1 is about 0.046 inch and LP2 is about 0.039 inch.

Figure 7:
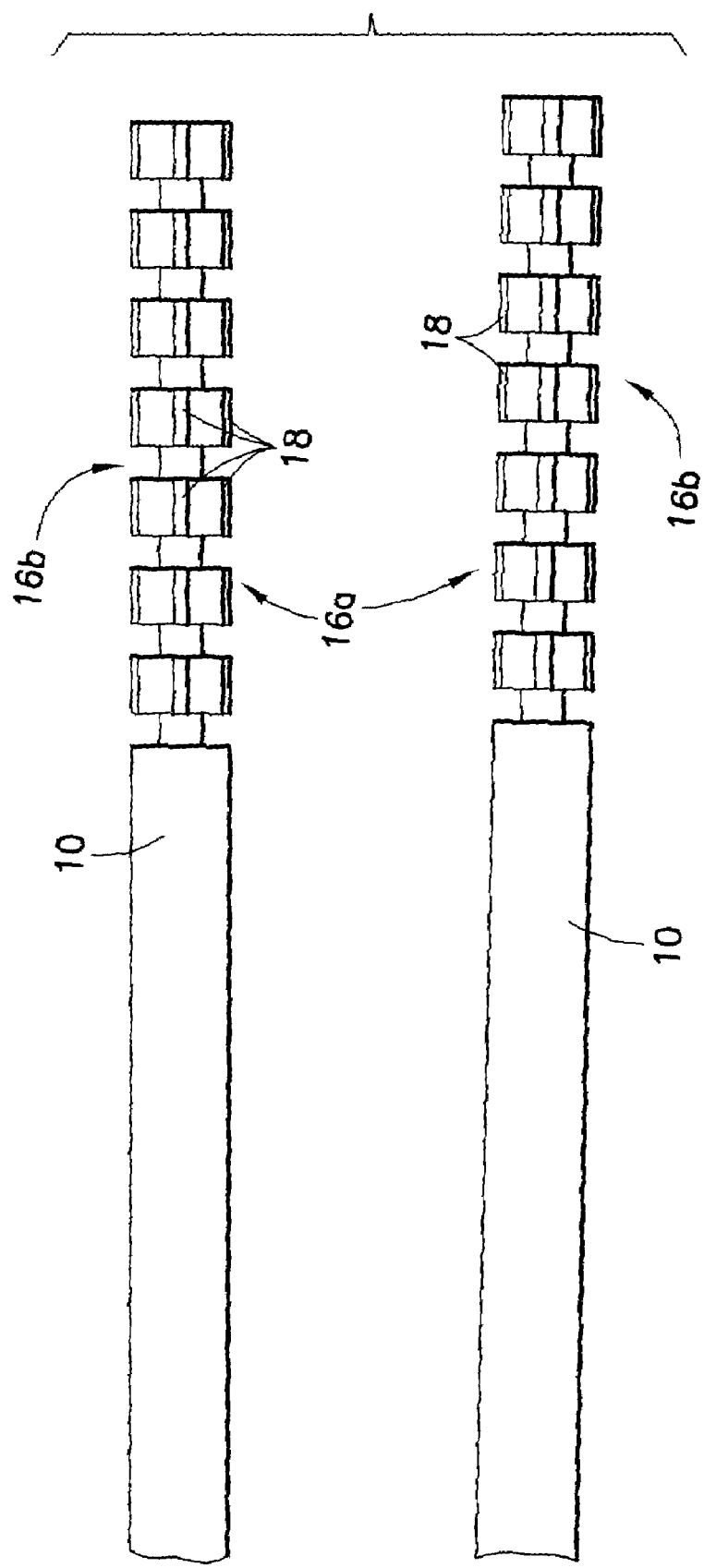
FIG. 7 is a partial plan view of a pair of food utensils including a food utensil similar to the utensil of FIG. 1.

In FIG. 7, two chopsticks 10 are shown as a pair for use as, for example, eating utensils, wherein food is grasped between mutually facing food-grabbing inside surfaces 16a of the chopsticks. One advantage of having protrusions 18 disposed circumferentially around a chopstick is that even if one or both chopsticks are rolled axially in the user's hand, mutually facing food-grabbing surfaces 16a will always have protrusions on one chopstick facing protrusions on the other. If protrusions were provided only on one side of a chopstick, as are the serrations shown in aforesaid U.S. Pat. No. 6,454,328, the food-gripping function of the protrusions would be dependent upon a specific orientation of the chopsticks in the user's hand. That is, the protrusions could only cooperate to grab food if the chopsticks were oriented in the user's hand such that the protrusions on each chopstick faced towards the other chopstick. In the absence of a retaining device such as a hinge between the chopsticks, a new user may find it difficult to avoid rolling one or both chopsticks in his or her hand, and so may easily loose the benefit of the protrusions formed only on one side of a chopstick. Therefore, an advantage resulting from having protrusions disposed circumferentially around the end of the chopstick is that the user is assured of the food-gripping benefit of the protrusions regardless of the orientation of the chopstick in the hand and without the need for a hinge or other orientation-fixing device.

Figure 8:
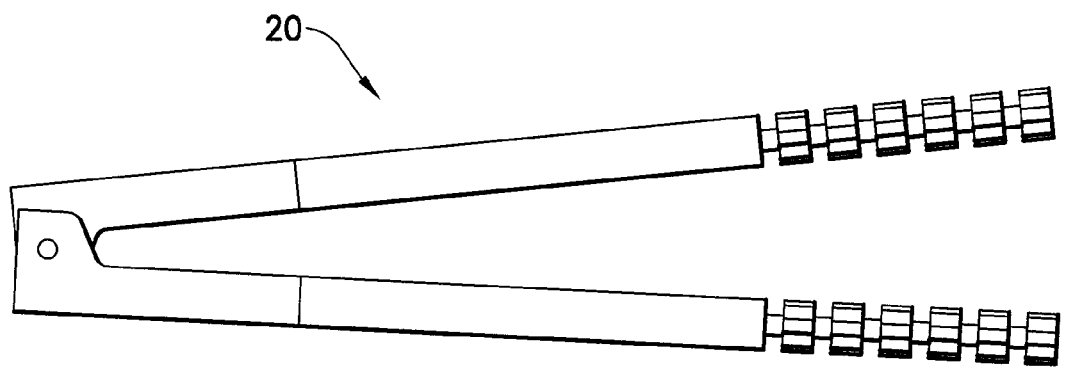
FIG. 8 is an elevational view of a pair of hinged food utensils according to another embodiment of the invention.

Another advantage attained by some embodiments of the present invention relates to the fact that certain foods, when grabbed between the mutually facing, inside grabbing surfaces of the elongated members, drape over the food-grabbing ends 12 of the elongate members 10 from between the mutually-facing inside surfaces 16a and rest against one or both of outside surfaces 16b. This occurs, for example, with noodles and certain vegetable leaves (cabbage, spinach, seaweed, etc.). By providing protrusions on both the inside grabbing surfaces 16a and the outside surfaces 16b, a utensil according to embodiments of the present invention provides additional traction with which to hold such food, even when the utensil is used in a hinged pair, i.e., as hinged chopsticks or as tongs 20 (FIG. 8).

Moreover, by providing in some embodiments utensils 10 that are textured at one end (e.g., the first end 12) and smooth and optionally tapered at the other end (e.g., the second end 14) (see FIG. 1), the invention provides a utensil that is appropriate for users of chopsticks who wish to take advantage of the food-gripping textured surface and also appropriate for those comfortable with traditional, smooth-ended chopsticks.

It should be understood that the invention is not limited with regard to the material from which the utensil is formed, and that any material suitable for the manufacture of a traditional chopstick or tong (wood, plastic, metal, ceramic, etc.) may be used to make a utensil as described herein. Similarly, it should be understood that the utensil and, in particular, the elongate member may be comprised of a member having a round, square, rectangular or like, cross-section.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:
1. A food utensil, comprising:
an elongated member having a first end, a second end and an intermediate portion, the intermediate portion having a longitudinal surface extending axially from the first end to the second end,
the longitudinal surface including a textured portion extending axially a first length from the first end toward the second end, the textured portion includes a core portion, a plurality of longitudinal grooves and a plurality of circumferential grooves, the longitudinal grooves and the circumferential grooves intersect to define two or more circumferential rows of protrusions over the first length of the textured portion,
the protrusions extending upwardly a second length from the core portion toward the longitudinal surface, each of the protrusions having an upper portion, the protrusions include a first subset of protrusions having the upper portion of a first width and a second subset of protrusions having the upper portion of a second width, where the first width being wider than the second width.

2. The food utensil of claim 1, wherein the longitudinal surface around the second end of the elongated member is smooth.

3. The chopstick according to claim 1, wherein the longitudinal and circumferential grooves are each about 0.062 inch wide.

4. A pair of chopsticks each according to claim 1.

5. The food utensil of claim 1, wherein at least one of each of the first subset of protrusions and the second subset of protrusions is included in each of the two or more circumferential rows of protrusions.

6. The food utensil of claim 1, wherein the two or more circumferential rows of protrusions include at least one row having only one of the first subset of protrusions and the second subset of protrusions.

7. The food utensil of claim 1, wherein each of the two or more circumferential rows includes four protrusions, the first subset includes a first pair of the four protrusions and the second subset includes a second pair of the four protrusions, members of the first pair and the second pair alternating circumferentially around the longitudinal surface of the first end.

8. The food utensil of claim 1, wherein the second length of the protrusions from the core portion toward the longitudinal surface is varied such that the protrusions taper from a first diameter proximate a center of the intermediate portion to a second diameter at the first end, the first diameter being larger than the second diameter.

9. The food utensil of claim 1, wherein the second length of the protrusions from the core portion toward the longitudinal surface is constant such that all of the protrusions extend upwardly a same length from the core portion toward the longitudinal surface.

10. The food utensil of claim 1, wherein the second length of the protrusions from the core portion toward the longitudinal surface is constant such that all of the protrusions extend upwardly from the core portion to the longitudinal surface.

11. The food utensil of claim 1, wherein the longitudinal surface includes a portion having indicia thereon.

12. The food utensil of claim 11, wherein the indicia includes at least one of advertising information, source identification, destination identification and event identification.

* * * * *